United States Patent
Cosentino et al.

(10) Patent No.: US 12,554,535 B2
(45) Date of Patent: Feb. 17, 2026

(54) IDLING AND WAKING A SENDER NODE FOR EVENT MESSAGE DELIVERY IN A COMPUTING ENVIRONMENT

(71) Applicant: Red Hat, Inc., Raleigh, NC (US)

(72) Inventors: Andrea Cosentino, Rome (IT); Paolo Antinori, Novara (IT)

(73) Assignee: Red Hat, LLC, Raleigh, NC (US)

( * ) Notice: Subject to any disclaimer, the term of this patent is extended or adjusted under 35 U.S.C. 154(b) by 420 days.

(21) Appl. No.: 18/219,926

(22) Filed: Jul. 10, 2023

(65) Prior Publication Data

US 2025/0021375 A1 Jan. 16, 2025

(51) Int. Cl.
G06F 9/48 (2006.01)

(52) U.S. Cl.
CPC .................................. G06F 9/4881 (2013.01)

(58) Field of Classification Search
CPC ................ G06F 9/4881; G06F 1/3209; G06F 2209/548; G06F 9/5022; G06F 9/505; G06F 9/546; G06F 9/542
See application file for complete search history.

(56) References Cited

U.S. PATENT DOCUMENTS

| | | |
|---|---|---|
| 8,769,134 B2 | 7/2014 | Calder et al. |
| 10,361,985 B1 | 7/2019 | Shveykin et al. |
| 10,382,380 B1 | 8/2019 | Suzani et al. |
| 10,454,795 B1 | 10/2019 | Jonsson et al. |
| 10,565,034 B2 | 2/2020 | Zhang et al. |
| 11,609,803 B2 | 3/2023 | Ferraro et al. |
| 2007/0058541 A1 | 3/2007 | Pike et al. |
| 2012/0303725 A1* | 11/2012 | Sato ...................... H04L 51/214 709/206 |
| 2013/0042001 A1 | 2/2013 | Gould et al. |
| 2015/0381709 A1 | 12/2015 | Word |
| 2017/0192693 A1 | 7/2017 | Gupta et al. |
| 2017/0214762 A1 | 7/2017 | Swain et al. |
| 2017/0310628 A1 | 10/2017 | Norwood et al. |
| 2018/0176070 A1 | 6/2018 | Shafiee et al. |
| 2019/0014171 A1 | 1/2019 | Stein et al. |

(Continued)

OTHER PUBLICATIONS

Anonymous, "Amazon SQS FIFO (First-In-First-Out) queues," Amazon Simple Queue Service, Amazon Web Services, Inc. 2020: pp. 1-6, <https://docs.aws.amazon.com/AWSSimpleQueueService/latest/SQSDeveloperGuide/FIFO-queues.html>.

(Continued)

*Primary Examiner* — Sisley N Kim
(74) *Attorney, Agent, or Firm* — Kilpatrick Townsend & Stockton LLP

(57) ABSTRACT

Event delivery can be managed by an event broker in a distributed computing environment. The event broker can receive an event message from a producer device, the event message having a payload and a key. The event broker can store the event message in an event queue based on the key. A sender node can transmit the event message to an event consumer. Subsequent to transmitting the event message, the event broker can cause the sender node to enter an idle state. The event broker can receive an error message from the event consumer while the sender node is in the idle state. After receiving the error message, the event broker can wake the sender node from the idle state. The sender node can initiate a retry process involving iteratively re-transmitting the event message to the event consumer.

20 Claims, 5 Drawing Sheets

(56) References Cited

U.S. PATENT DOCUMENTS

| | | |
|---|---|---|
| 2019/0361755 A1 | 11/2019 | Cote |
| 2020/0034216 A1 | 1/2020 | Kolodzieski et al. |
| 2020/0067903 A1* | 2/2020 | Yegorin ............... H04L 67/562 |
| 2020/0169616 A1 | 5/2020 | Chen et al. |
| 2020/0225982 A1 | 7/2020 | Jung et al. |
| 2021/0126780 A1 | 4/2021 | Baird, III |
| 2022/0014594 A1* | 1/2022 | Mladin .................. H04L 43/10 |
| 2024/0340354 A1* | 10/2024 | Wakabayashi .......... H04L 67/12 |

OTHER PUBLICATIONS

Guo, "Knative Eventing 101: Exercises to enable Knative services to consume events," IBM, Oct. 1, 2019: pp. 1-4, <https://developer.ibm.com/technologies/containers/tutorials/knative-eventing-101-labs/>.

Ibryam, "Kubernetes Workloads in the Serverless Era: Architecture, Platforms, and Trends," Principal Architect at Red Hat, Aug. 12, 2019: pp. 1-29, <https://infoq.com/articles/kubernetes-workloads-serveerless-era/>.

MSV, "Knative Brings Event-Driven and Serverless Computing to Kubernetes," Janakiram MSV, Nov. 1, 2019: pp. 1-5, <https://thenewstack.io/knative-brings-event-driven-and-serverless-computing-to-kubernetes/>.

Richardson et al., "Enriching Event-Driven Architectures with AWS Event Fork Pipelines," AWS Compute Blog, Amazon Web Services, Inc., Mar. 25, 2019: pp. 1-11, <https://aws.amazon.com/blogs/compute/enriching-event-driven-architectures-with-aws-event-fork-pipelines/>.

* cited by examiner

IDLING AND WAKING A SENDER NODE FOR EVENT MESSAGE DELIVERY IN A COMPUTING ENVIRONMENT

TECHNICAL FIELD

The present disclosure relates generally to event delivery in a computing environment. More specifically, but not by way of limitation, this disclosure relates to idling and waking a sender node for event message delivery in a computing environment.

BACKGROUND

Distributed computing environments have recently grown in popularity. One type of distributed computing environment is a serverless computing environment. A serverless computing environment is a distributed computing environment with serverless computing capabilities. Serverless computing allows a developer to execute code without having to consider how to provision the appropriate computing resources for the code. For example, a serverless computing environment can automatically provision the resources required to run the code and scale to meet demand, without burdening the developer with those details. Since this setup and scaling of resources is hidden and abstracted from the developer, the computing environment appears to be "serverless" to the developer, despite it actually including one or more physical or virtual servers.

Distributed computing environments can have event-driven architectures that use events to trigger and communicate between software services ("services"). Event-driven architectures generally have three key components: event producers, event brokers, and event consumers. An event producer is a service that transmits an event message indicating an event to the event broker. An event can be a change in state or an update, like an item being placed in a shopping cart on an e-commerce website. The event broker is a service that can filter and route event messages to the event consumers. The event consumers are services that react to the event messages. In a distributed computing environment, event consumers may be dynamically scalable based on their load (e.g., the number of incoming event messages). For example, the number of instances of an event consumer can be dynamically scaled up as the load increases or scaled down as the load decreases. In some cases, the number of instances of an event consumer can be scaled all the way down to zero.

DETAILED DESCRIPTION

Figure 1:
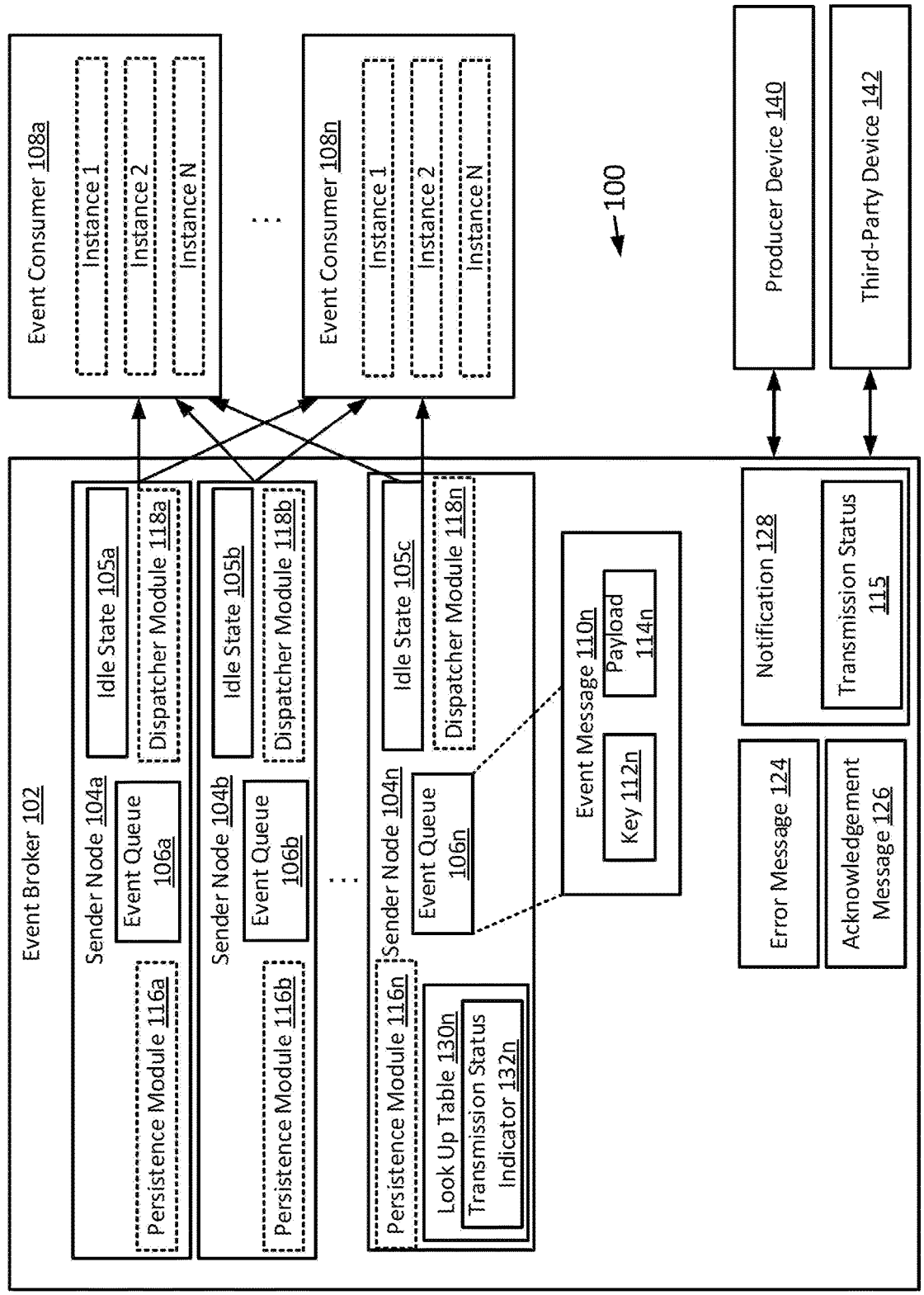
FIG. 1 is a block diagram of an example of a system for idling and waking a sender node for event message delivery in a computing environment according to some aspects of the present disclosure.

A distributed computing environment, such as an edge computing environment, can include an event broker that can transmit event messages to an event consumer. For example, a sender node that is associated with the event broker can receive event messages from a producer device (e.g., a sensor apparatus) in the edge computing environment and can transmit the event message to the consumer device in the edge computing environment. However, in some examples, certain devices in the edge computing environment may have limited access to computing resources. For example, the sender node may be battery-operated and may have access to a limited amount of power. Configuring the sender node to continually poll for event messages or responses from the event consumer may cause the sender node to expend unnecessary amounts of computing resources (e.g., onboard memory, bandwidth, processing power, and battery life).

Some examples of the present disclosure can overcome one or more of the abovementioned problems idling and waking a sender node for event message delivery. For example, an event broker can receive one or more event messages from an event producer. Each event message can include a key and a payload. A "key" is a unique identifier usable for designating related event messages. The event broker can store each event message in an event queue (e.g., a first-in-first-out buffer) that is specific to the particular key and a particular event consumer. The event broker can then transmit the event messages to an event consumer that is subscribed to receive event messages from the event queue. After transmitting the event message to the event consumer, the event broker can cause the sender node to enter an idle state. The idle state can be a low-power state in which a processing device of the sender node is performing a limited number of tasks (e.g., critical tasks) and consumes significantly less power than in an active state. For example, certain subroutines that the processing device may be executing during an active state of the processing device may be suspended during the idle state. In some examples, the transmission may be unsuccessful, and the event consumer may generate an error message. The event broker can receive an error message from the event consumer while the sender node is in the idle state.

In response to receiving the error message, the event broker can wake the sender node from the idle state. This may involve transmitting an electronic signal (e.g., a wake-up signal) to the processor of the sender node. Once the sender node has been awoken from the idle state, the sender node can initiate a retry process. The retry process can involve iteratively re-transmitting the event message to the event consumer. For example, the retry process can involve re-transmitting the event message to the event consumer until either a threshold number of retry attempts have been performed or until an acknowledgement message is received from the event consumer. If the re-try process fails (e.g., the threshold number of retry attempts is reached), the sender node may discard the event message. In this way, the event broker can automatically switch the sender node between active and idle modes to conserve computing resources.

In some examples, the event broker can transmit the event messages in the order in which the event messages are positioned in the queue. This can preserve the sequential order of the event messages, such that two distinct event messages A and B having the same key will be processed in by the event consumer in sequential order (e.g., A will be processed strictly before B), whereas two distinct event messages C and D having different keys from one another can be processed in any order by the event consumer.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for idling and waking a sender node for event message delivery in a computing environment according to some aspects of the present disclosure. Examples of the distributed computing environment 100 can include a cloud computing environment, a data grid, or a computing cluster. In some cases, the distributed computing environment 100 can be a serverless computing environment.

The distributed computing environment 100 can employ an event-driven architecture that includes a producer device 140 configured to produce event messages 110, an event broker 102 configured to queue and forward the event messages 110, and one or more event consumers 108a-n configured to perform functions in response to the event messages 110. Examples of the producer devices 140 can include sensors, cameras, Internet of Things (IoT) devices, and any other suitable devices that can produce event messages 110. Examples of the consumer devices 108a-n can include device hubs, display devices, IoT devices, and any other devices that can consume event messages 110. In some examples, the producer device 140 and the event broker 102 can be the same device. For example, the event broker 102 can include the producer device 140. In some examples, the event broker 102 and the producer device 140 can be edge-computing devices in an edge network.

The producer device 140 can include a software service that can detect events and generate one or more event messages 110 based on the detected events. The distributed computing environment 100 can include any number of event producers for generating any number of event messages 110, though only a single producer device 140 is shown in FIG. 1 for simplicity. Each event message 110 can include a payload 114. The payload 114 can include the content of the event message 110 and may contain distinct sections, such as a body and headers. Some (but not necessarily all) event messages 110 may also include a key 112. The key 112 can be distinct from the payload 114 and may be incorporated into the event message 110 separately from the payload 114. The key 112 can serve as a unique identifier that is usable to group and sequence event messages 110, as described in greater detail later on.

The producer device 140 can include rules for determining if a key 112 is to be assigned to an event message 110, as well as which key 112 to assign to the event message 110. The rules can include relationships between keys 112 and event parameters. Examples of event parameters can include the type or content of the event, a user that triggered the event, an event consumer associated with the event, functionality that is to be invoked based on the event, or any combination of these. The producer device 140 can apply the rules to an event's parameters for determining if a key 112, and which key 112, is to be assigned to the event. If a key 112 is to be assigned to an event, the producer device 140 can then incorporate the determined key 112 into an event message 110 corresponding to the event. The producer device 140 can repeat this process for each event to determine keys 112 for some or all of the event messages 110.

In some examples, the producer device 140 can determine how to distribute the event messages 110 among sender nodes 104a-n (e.g., servers or other computing devices) of the event broker 102 based on the keys 112 associated with the event messages 110. In some examples, the sender nodes 104a-n can be edge-computing devices in an edge network. Distributing the event messages 110 among the sender nodes 104a-n can serve to balance a load on the event broker 102. In particular, the event broker 102 may be formed from any number of sender nodes 104a-n, which can be dynamically scaled to meet demand. Each of the sender nodes 104a-n can be assigned to handle a set of event-message keys that is different from, and non-overlapping with, the sets of keys assigned to the other sender nodes 104a-n. For example, node 114a can be assigned to handle keys 1-3, node 114b can be assigned to handle keys 4-6, and node 114n can be assigned to handle keys 7-9. The producer device 140 can determine how to distribute the event messages 110 among the sender nodes 104a-n based on a mapping that correlates the keys to their assigned sender nodes 104a-n. The producer device 140 can then transmit the event messages 110 to the appropriate sender nodes 104a-n. It will be appreciated that in other examples, the event broker 102 can alternatively include the mapping for distributing incoming event messages 110 among the sender nodes 104a-n.

In some examples, the mapping can be a database that includes relationships between keys 112 and sender nodes 104a-n, such that each key is assigned to one (and only one) node. Alternatively, the mapping can include a mathematical algorithm for converting keys 112 to node identifiers. An example of such a mathematical algorithm may be a hash function, such as $F(key, n)=(integer\_hash(key) \% n)+1$. This function computes an integer hash-value from the key and applies a modulo function, plus one, on the result. The output of the function is a number ranging from 1 to n, which can be used as an identifier for a destination node in the event broker 102. Such a function can be used to randomly assign keys 112 proportionally across the available sender nodes 104a-n, such that the same key is always assigned to the same node. But in other examples, other mathematical algorithms can be used to map the keys 112 to the sender nodes 104a-n.

The event broker 102 can include a service that can filter and route event messages 110 to the event consumer 108. In some examples, the event broker 102 can be an edge computing device in an edge network. In some examples, the event broker 102 may be the same device as the producer device 140. In other examples, the event broker 102 may be a different device from the producer device 140 and communicatively coupled with the producer device 140. The event broker 102 can determine which event messages 110 to transmit to which event consumer 108 and can handle errors related to transmitting the event messages 110. The event broker 102 can manage one or more sender nodes 104a-n that can transmit event messages 110 to one or more event consumers 108.

The sender nodes 104a-n can be devices in the computing environment 100 that can transmit information, such as event messages 110, to the event consumer 108. As shown in FIG. 1, each sender node 104a-n can include a persistence module 116 and a dispatcher module 118. The persistence module 116 can be an executable software module. The persistence module 116 can receive incoming event messages 110 (e.g., event messages 110) and store event details included in the event messages 110 in storage associated with the sender node 104. Storage can include any kind of volatile or non-volatile storage. For example, storage can include random access memory, cache memory, a hard disk, a solid state drive, or any combination of these. Storing the event details can allow for longer-term persistence of the event details, which may be useful for analyzing how events are handled by the event broker 102. Before or after storing the event details, the persistence module 116 can forward the event messages 110 to a dispatcher module 118.

The dispatcher module 118 can be an executable software module configured to receive event messages 110 and organize them in event queue 106. The dispatcher module 118 may receive the event messages 110 from the persistence module 116 in examples that include the persistence module 116. Alternatively, the dispatcher module 118 may receive the event messages 110 from another source (e.g., the event producer 140) in examples that lack the persistence module 116.

After receiving an event message 110, the dispatcher module 118 can determine a key and an event consumer associated with the event message 110. For example, the event consumers may be subscribed with the event broker 102 to receive certain types of event messages 110, such as event messages 110 having certain keys 112. Based on these subscriptions, the dispatcher module 118 can receive an incoming event message 110, extract a key from the event message 110, and determine an event consumer for the event message 110. The dispatcher module 118 can then append the event message 110 to an end of an event queue that is specifically designated for that key and event consumer. The dispatcher module 118 can repeat this process for each event message 110 that is received, thereby maintaining the sequential order of event messages 110 having the same <key, event consumer> pair in the event queue 106.

The event queue 106 can be stored any kind of volatile or non-volatile storage. For example, the storage can include random access memory, a cache memory, a hard disk, a solid state drive, or any combination of these. Each event queue 106 can be specifically and uniquely designated for a <key, event consumer> pair. For example, there may be only one dispatching queue for each <key, event consumer> pair, and that dispatching queue may only consist of event messages 110 for that <key, event consumer> pair. As specific examples, event queue 106 may be specifically designated for storing event massages that have a Key of 1 and a destination of Event Consumer A, event queue 106 may be specifically designated for storing event massages that have a Key of 2 and a destination of Event Consumer A, event queue 106 may be specifically designated for storing event massages that have a Key of 1 and a destination of Event Consumer B, and so on. Each of the event queue 106 may be a first-in-first-out (FIFO) queue, such as a FIFO buffer, that is configured to maintain a sequential order of event messages 110 based on their receipt time.

In some examples, the storage may lack an event queue for a particular <key, event consumer> pair. For example, the dispatcher module 118 may receive an event message 110 having a Key of 1 and a destination of Event Consumer N, but an event queue 106 for that <key, event consumer> pair may not exist in storage. If the dispatcher module 118 determines that a required event queue 106 does yet not exist in storage, the dispatcher module 118 can automatically generate the event queue 106 in storage. After generating the event queue 106, the dispatcher module 118 can add the event message 110 to the event queue 106.

Figure 5:
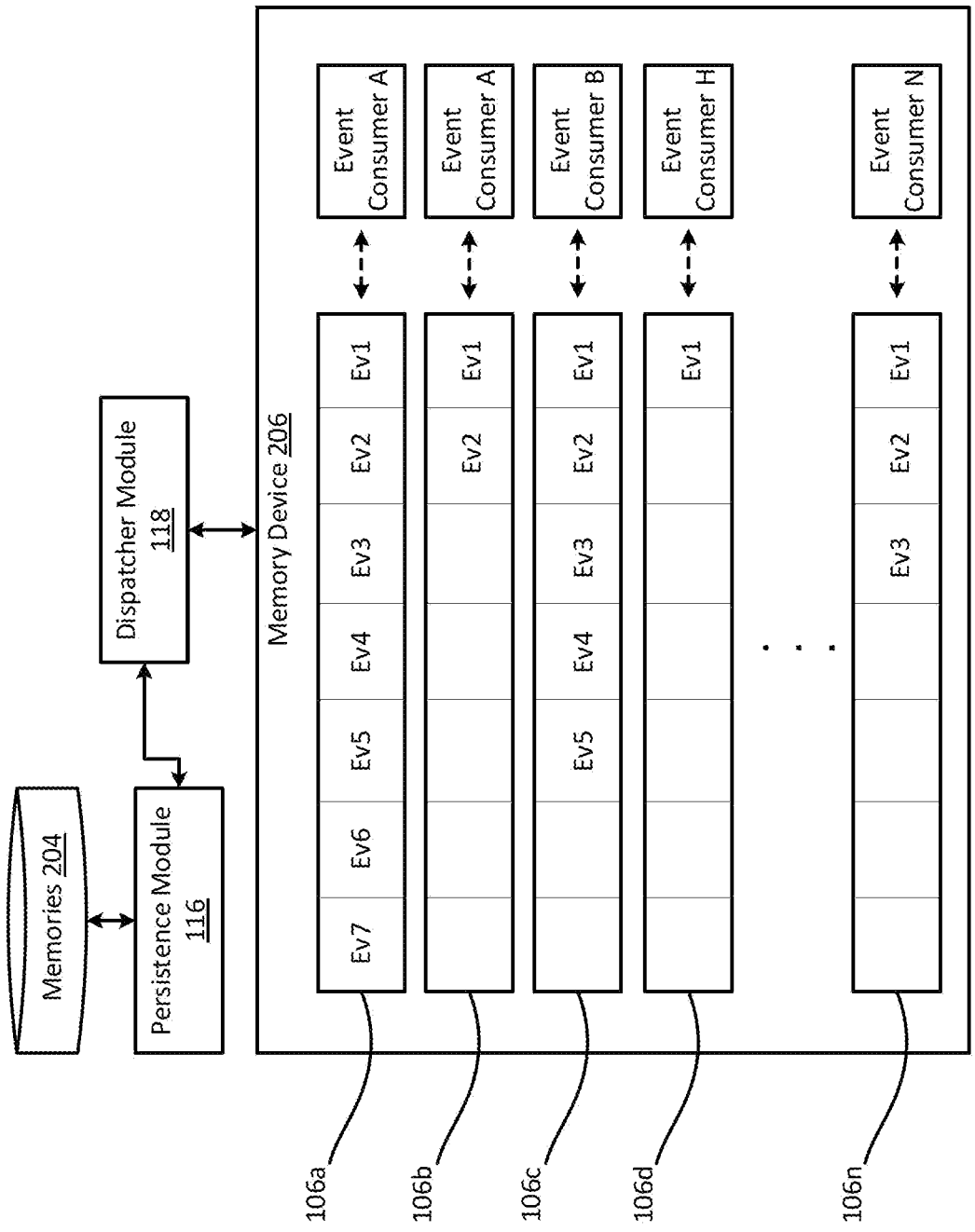
FIG. 5 shows a block diagram of an example of event messages stored in queues according to some aspects of the present disclosure.

As event messages 110 are received by the dispatcher module 118, the dispatcher module 118 can position the event messages 110 into the appropriate event queue 106 in the order in which the event messages 110 were received. One example of this is shown in FIG. 5. In the example shown in FIG. 5, events that are older in time are designated with lower numbers (e.g., Ev1) and events that are newer in time are designated with higher numbers (e.g., Ev7). By ordering the events messages in the event queue 106 in this way, the sequential order of event messages 110 having the same key and event consumer 108 can be preserved.

Still referring to FIG. 5, the dispatcher module 118 can transmit (e.g., push) event messages 110 from each event queue 106 to its corresponding event consumer in the order in which the event messages 110 are stored in the event queue 106. For example, the dispatcher module 118 can transmit event messages Ev1-Ev7 to Event Consumer A in the order in which those event messages 110 are stored in event queue 106. In particular, the dispatcher module 118 can transmit event message Ev1, then event message Ev2, then event message Ev3, the event message Ev4, and so on. Sequentially transmitting the event messages 110 in this way can avoid problems typically arising from event messages 110 being delivered out-of-order or concurrently to an event consumer. If an event queue 106 becomes completely depleted such that there are no more event messages 110 remaining in the event queue 106 (e.g., the event queue 106 is empty), the dispatcher module 118 can remove the event queue 106 from storage. This may help preserve memory space and other computing resources.

In some examples, the dispatcher module 118 may receive an event message that lacks a key, since not all event messages 110 may have a key. If an event message lacks a key, the dispatcher module 118 may forward the event message to the appropriate event consumer, without first queuing the event message in an event queue 106. In this way, event messages 110 that include keys 112 can be queued and maintained in their sequential order, whereas event messages 110 that exclude keys 112 can be automatically forwarded upon receipt. This can be referred to as "partial order management," since the event broker 102 is sensitive to the sequential order of some types of event messages 110 (e.g., event messages 110 with keys 112) but agnostic to the order of other types of event messages 110 (e.g., event messages 110 that lack keys 112).

Referring back to FIG. 1, the sender nodes 104a-n can transmit event messages 110 to the event consumers 108a-n in accordance with the abovementioned process. The event consumers 108a-n can respond to the event messages 110 by performing one or more operations (e.g., functions). The event consumers 108a-n can be any suitable type of software that is triggerable in response to the event messages 110. One exemplary type of event consumer can be a serverless function, such as a Lambda function in Amazon Web Services. A serverless function can be an ephemeral, self-contained, discrete piece of code (e.g., set of logic or operations) configured to perform a particular task when executed in a distributed computing environment 100 and then become dormant when execution completes. Another exemplary type of event consumer can be a microservice. A microservice can be a self-contained stateless service that is generally designed to perform a specific task. Microservices can communicate with each other through well-defined application programming interfaces (APIs) in order to work together to generate responses to end-user requests. Serverless functions and microservices may be individually "owned" or developed by different developers and deployed independently of each other, which can provide improvements to scalability, robustness, isolation, and development time over conventional monolithic software-applications.

Each of the event consumers 108a-n can be an autoscaling pool of instances. That is, each of the event consumers 108a-n can include an adjustable number of instances that is automatically scalable by the distributed computing environment 100 in response to one or more conditions. For example, the distributed computing environment 100 can dynamically scale up the number of instances of event consumer 108a in response to an increased loading condition (e.g., an increased number of events) or can dynamically scale down the number of instances of event consumer 108a in response to a decreased loading condition. But this dynamic scaling may not impede proper delivery of event messages 110 in some examples, since the order in which the event broker 102 transmits event messages 110 to an event consumer 108a is independent of the number of instances of the event consumer 108a.

After transmitting the event message 110, the sender node 104a may enter an idle state 105. For example, the event broker 102 can transmit a command that can cause the sender node 104a to enter the idle state 105. Alternatively, the sender node 104a can determine that the event queue 106 is empty and, in response, can enter the idle state 105. In some examples, a sender node 104a may attempt to transmit an event message 110 to an event consumer 108a, but the transmission may be unsuccessful. For example, the event consumer 108a may generate an error message 124 to the event broker 102. The event broker 102 can receive an error message from the event consumer while the sender node is in the idle state.

In response to receiving the error message, the event broker 102 can wake the sender node 104a from the idle state. For example, the event broker 102 can transmit a command to the sender node 104a that can cause the sender node 104a to transition from an idle state to an active state. Once the sender node 104a has been awoken from the idle state, the sender node 104a can automatically initiate a retry process. For example, the sender node 104a can identify an unsuccessfully transmitted event message 110 and initiate the retry process for the identified event message 110. In some such examples, the event broker 102 can notify the sender node 104a of the failed transmission so that the sender node 104a knows which event message to re-transmit. The retry process can involve iteratively re-transmitting the event message 110 to the event consumer 108. For example, the sender node 104a can re-transmit the event message to the event consumer 108a until either a threshold number of retry attempts have been performed (e.g., 5 attempts) or until an acknowledgement message 126 is received from the event consumer 108a. The acknowledgement message 126 can indicate that the event consumer 108a successfully received the event message 110.

In some examples, the event broker 102 can receive a notification 128 from any of the event consumers 108a-n. The notification can indicate a transmission status of the event message 110. Examples of the transmission status can be success or failure. Based on receiving the notification, the event broker 102 can modify a transmission status indicator 132 in a lookup table 130 to indicate the transmission status of the event message 110. In some examples, the lookup table 130 can correspond to a particular event queue 106. Thus, each event queue 106 can have its own lookup table indicating the transmission statuses of event messages associated with that queue. In some examples, the event broker 102 can determine that the event message 110 has been successfully transmitted to the event consumer 108. For example, the event broker 102 can receive the acknowledgement message 126 from the event consumer 108 and, based on the acknowledgement message 126, determine that the event message 110 has been successfully transmitted to the event consumer 108. In response to determining that the event message 110 has been successfully transmitted, the event broker 102 can remove the event message 110 from the event queue 106 and update its transmission status in the lookup table 130 accordingly.

It will be appreciated that the examples shown in FIG. 1 are intended to be illustrative and non-limiting. Other examples may include more components, fewer components, different components, or a different arrangement of the components shown in FIG. 1. For instance, some examples may lack the persistence module 116 or may combine the functionality of the persistence module 116 and the dispatcher module 118 together into a single module. Additionally, the distributed computing environment 100 can include any number and combination of producer devices 140, sender nodes 104a-n, event consumers 108a-n, and event queues 106a-n.

Figure 2:
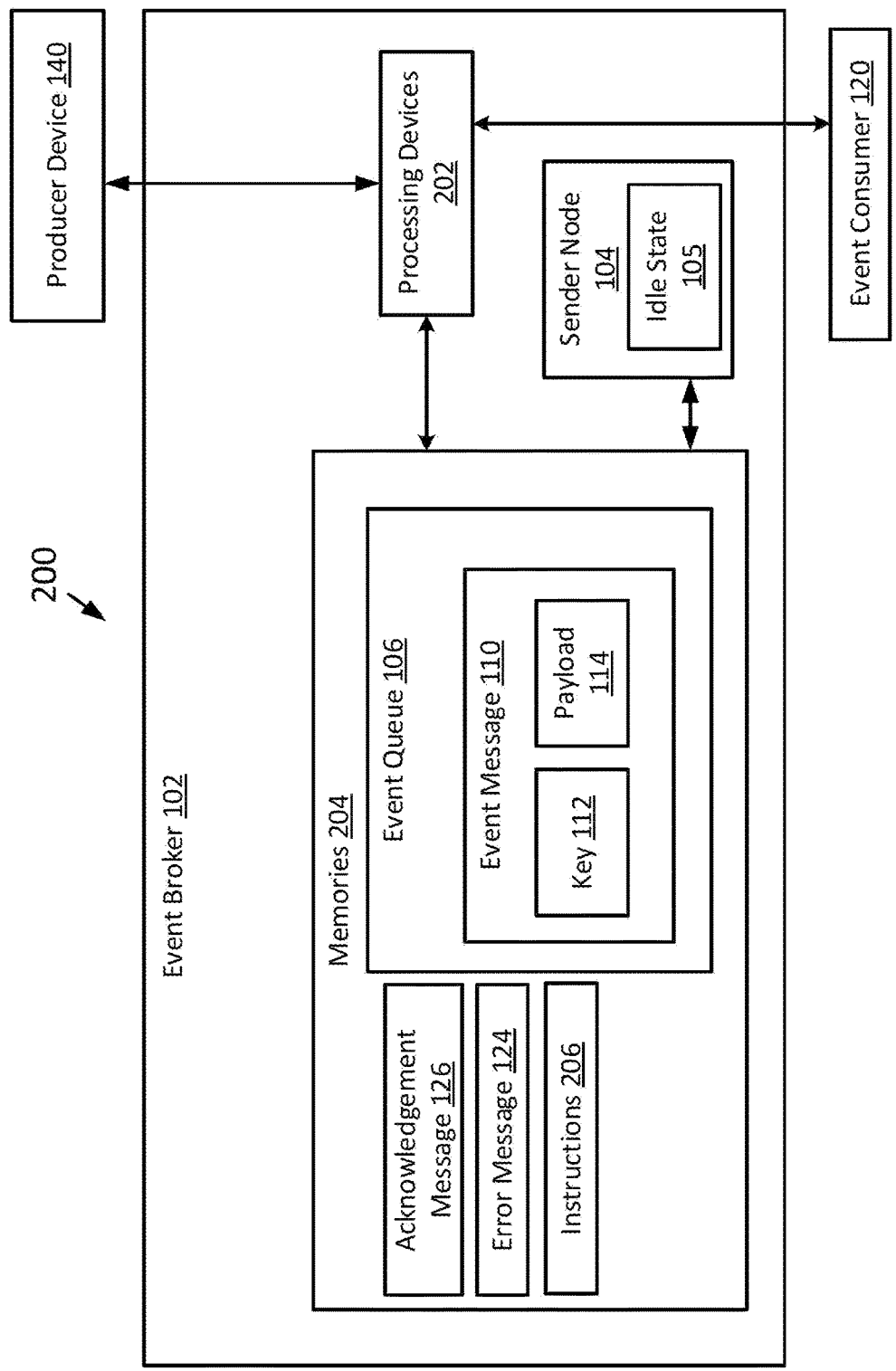
FIG. 2 is a block diagram of another example of a system for idling and waking a sender node for event message delivery in a computing environment according to some aspects of the present disclosure.

FIG. 2 is a block diagram of another example of a system 200 for idling and waking a sender node for event message delivery in a computing environment according to some aspects of the present disclosure. The system 200 can include one or more processing devices 202 coupled to one or more memories 204. The processing devices 202 can include one processor or multiple processors. Examples of the processing devices 202 include a Field-Programmable Gate Array (FPGA), an application-specific integrated circuit (ASIC), or a microprocessor. The processing devices 202 can execute instructions 206 stored in the memory 204 to perform one or more operations. In some examples, the instructions 206 can include processor-specific instructions generated by a compiler or an interpreter from code written in any suitable computer-programming language, such as C, C++, C#, and Java.

The memory 204 can include one memory device or multiple memory devices. The memory 204 can be volatile or non-volatile, in that the memory 204 can retain stored information when powered off. Examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processing devices 202 with the instructions 206 or other program code. Non-limiting examples of a computer-readable medium include magnetic disks, memory chips, ROM, random-access memory (RAM), an ASIC, a configured processor, optical storage, or any other medium from which a computer processor can read the instructions 206.

The processing devices 202 can be part of the event broker 102 and receive an event message from a producer device 140. The event message can have a payload 114 and a key 112. The processing devices 202 can store the event message 110 in an event queue 106 based on the key 112. The processing devices 202 can cause a sender node 104 of the event broker 102 to transmit the event message 110 to an event consumer 140 that is subscribed to receive event messages 110 from the event queue 106. Event consumers 140 may be able to selectively subscribe and unsubscribe to receive event messages from a given event queue. Subsequent to transmitting the event message 110 to the event consumer 140, the processing devices 202 can cause the sender node 104 to enter an idle state 105.

The processing devices 202 can receive an error message from the event consumer 140 while the sender node 104 is in the idle state 105. In response to receiving the error message, the processing device 202 can wake the sender node 104 from the idle state 105. Subsequent to waking from the idle state 105, the sender node 104 can initiate a retry process involving iteratively re-transmitting the event message 110 to the event consumer until either a threshold number of retry attempts have been performed or until an acknowledgement message is received from the event consumer 140.

Figure 3:
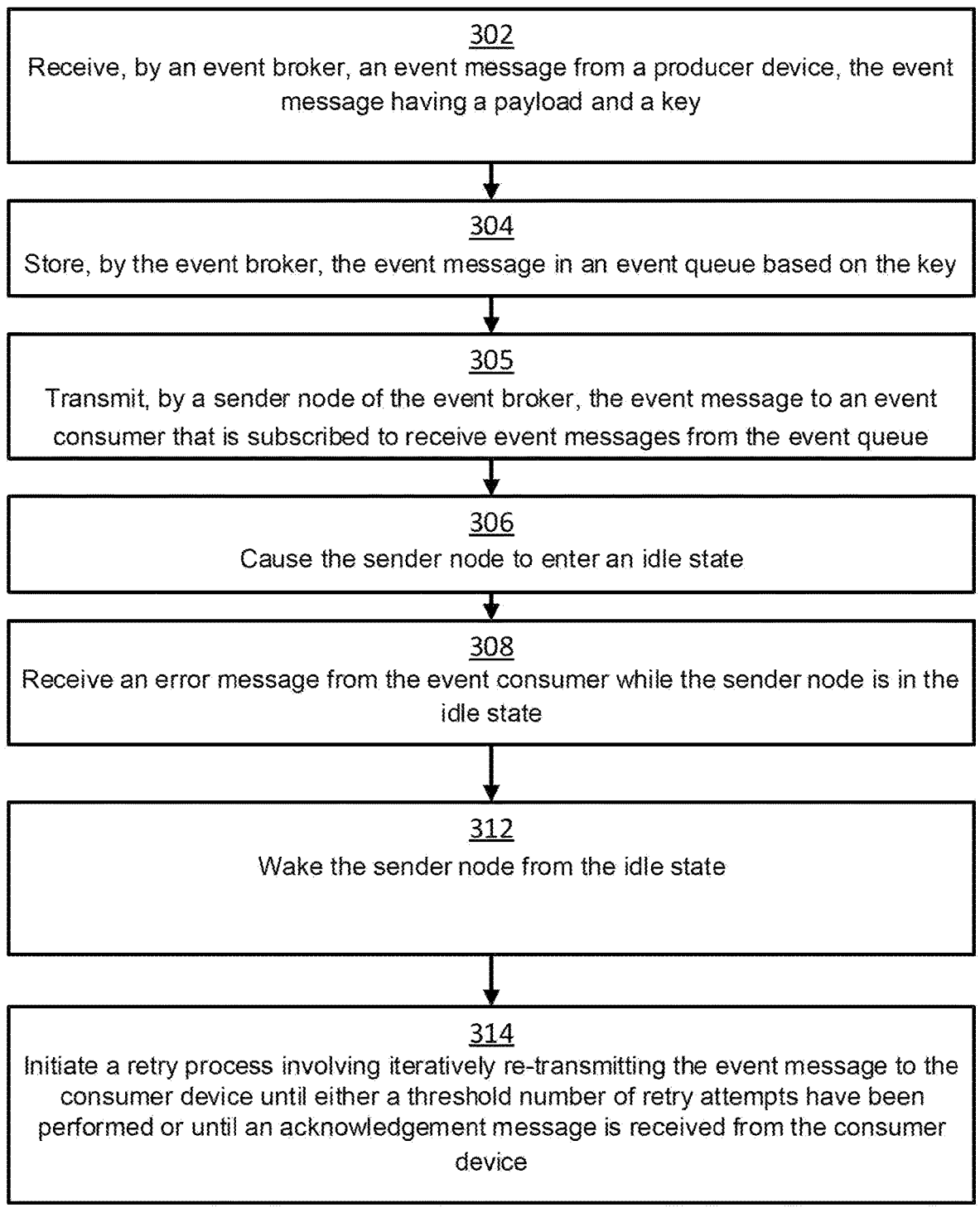
FIG. 3 is a flow chart of a process for idling and waking a sender node for event message delivery in a computing environment according to some aspects of the present disclosure.

FIG. 3 is a flow chart of a process for idling and waking a sender node for event message delivery in a computing environment according to some aspects of the present disclosure. Other examples may involve more operations, fewer operations, different operations, or a different sequence of operations than is shown. The operations of FIG. 3 are described below with respect to the components of FIG. 1 above.

At block 302, the event broker 102 receives an event message 110 from a producer device 140. In some examples, the event message 110 can include a payload 114 and a key 112. The producer device 140 can include internal logic that can determine which key 112 to assign to the event message 110.

At block 304, the event broker 102 stores the event message 110 in an event queue 106 based on the key 112. The event broker 102 can use the key 112 to determine a location within the event queue 106 in which to store the key 112. For example, the key 112 can include metadata that can indicate the time at which the event message 110 was generated, and which producer device 140 generated the event message. In some examples, the payload 114 can include the metadata. The event broker 102 can use the metadata to assign the event message 110 to a location in the event queue 106.

At block 305, a sender node 104 of the event broker 102 transmits the event message 110 to an event consumer 108 that is subscribed to receive event messages 110 from the event queue 106. For example, the event consumer 108 can be paired with the sender node 104 via a wireless communication channel (e.g., via Bluetooth.) Once paired, the sender node 104 can transmit relevant event messages 110 to the event consumer 108 via the wireless communication channel. In some examples, the event consumer 108 can transmit a request to the event broker 102 to subscribe to certain types of event messages 110. For example, a particular producer device 140 can generate event messages 110 based on temperature data. The computing environment 110 can include an event consumer 108 that may need the temperature data to initiate certain processes or to perform certain operations. So, that event consumer 108 can subscribe to the event messages generated by the particular producer device 140 and can receive the event messages 110 from the sender node 104 when the event messages 110 become available to the sender node 104.

At block 306, subsequent to transmitting the event message 110 to the event consumer 108, the event broker 102 causes the sender node 104 to enter an idle state 105. In some examples, the event broker 102 can cause the sender node to enter the idle state 105 substantially contemporaneous to transmitting the event message 110. For example, the event broker 102 can transmit a request or issue a command to the sender node 104 to cause the sender node to enter the idle state 105. In some examples, the event broker may cause the sender node to 104 to enter the idle state 105 after determining that one or more of its event queues 106 are empty, so that the sender node 104 does not prematurely enter the idle node before it has finished transmitting messages in its event queue(s). While the sender node 104 is in the idle state 105, the sender node 104 can still be connected to other devices in the computing environment 100, and can receive wake commands.

At block 308 the event broker 102 receives an error message 124 from the event consumer 108 while the sender node 104 is in the idle state 105. The error message 124 can indicate that the event message 110 was not successfully received by the event consumer 108. In some examples, the error message 124 can indicate a state of the event consumer 108.

At block 310 in response to receiving the error message 124, waking, by the event broker, the sender node from the idle state 105. In some examples, the event broker 102 can transmit a request to the sender node to wake the sender node from the idle state 105. The request can cause the sender node 104 to transition from the idle state 105 to an active state.

At block 312, subsequent to waking from the idle state, the sender node 104 initiates a retry process. This may involve the sender node 104 attempting to re-transmit the event message 110 one or more times to the event consumer 108. The sender node 104 can periodically retransmit the event message 110 to the event consumer 108 until a threshold number of retry attempts have been performed, such as 7 attempts. Additionally, or alternatively, the sender node 104 can periodically retransmit the event message 110 until an acknowledgement message is received from the event consumer 108.

Figure 4:
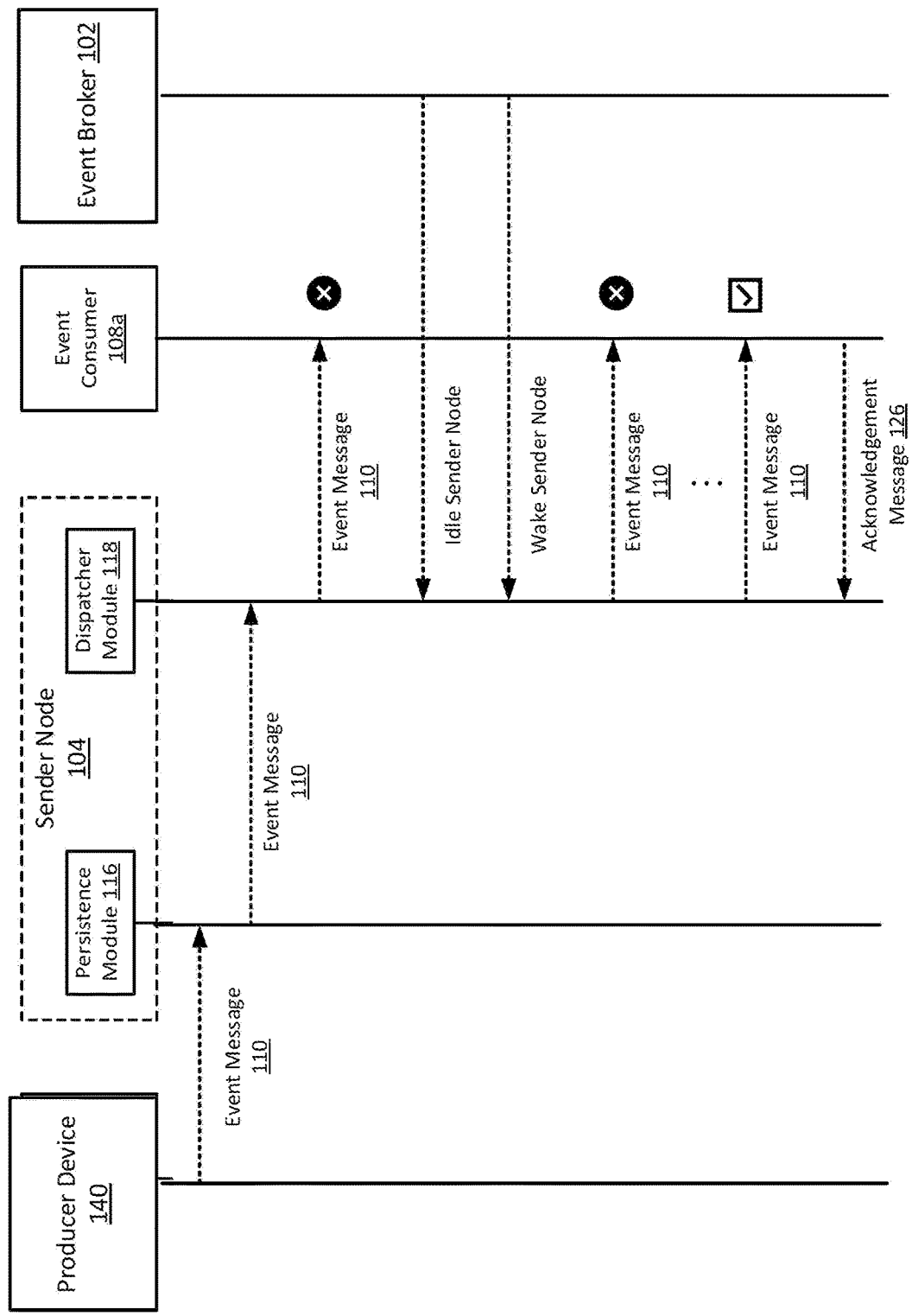
FIG. 4 is a sequence diagram of another example of a process for idling and waking a sender node for event message delivery in a computing environment according to some aspects of the present disclosure.

FIG. 4 is a sequence diagram of another example of a process for idling and waking a sender node for event message delivery in a computing environment 100 according to some aspects of the present disclosure. The exemplary process involves the producer device 140, event consumers 108a-b, persistence module 116, event broker 102, and dispatcher module 118 described above.

In the exemplary process depicted in FIG. 4, the producer device 140 generates an event message 110 and transmits the event message 110 to a persistence module 116 of the sender node 104. The persistence module 116 can generate a copy of the event message 110 and can store the copy to long-term, non-volatile storage. The persistence module 116 can transmit the event message 110 to the dispatcher module 118. The dispatcher module 118 can include an executable software module configured to store the event message in an event queue 106 of the sender node 104.

The dispatcher module can determine that the event message 110 is to be transmitted to a particular event consumer 108a. The dispatcher module 118 can attempt to transmit the event message 110 to the event consumer 108a. The sender node 104 can enter an idle state after transmitting the event message 110. For example, the event broker 102 can issue a command to cause the sender node 104 to enter the idle state. In the example shown in FIG. 4, the first attempt to transmit the event message 110 was unsuccessful. The event broker 102 can determine that the event message 110 was not successfully transmitted to the event consumer 108a, and in response, can wake the sender node 104. For example, the event broker 102 can transmit a command to the sender node 104 to wake the sender node 104.

After waking, the sender node 104 can initiate a retry process in which the sender node re-transmits the event message 110 to the event consumer 108a until a predefined threshold number of attempts is reached or the event consumer 108a responds in a way that indicates the transmission succeeded. For example, once the dispatcher module 118 has successfully transmitted the event message 110 to the event consumer 108a, the event consumer 108a can transmit an acknowledgement message 126 to the dispatcher module 118. The dispatcher module can halt the retry process upon receipt of the acknowledgement message 126. Having successfully transmitted the event message 110, the dispatcher module 118 may determine that the event queue 106 associated with the sender node 104 is now empty and responsively cause the sender node 104 to re-enter the idle state. The sender node 104 may remain in the idle state until a new event message is received from a producer device (e.g., producer device 140) and assigned to the sender node 104 by the event broker 102, at which point the event broker 102 may wake the sender node 104 and the process may repeat.

It will be appreciated that the abovementioned process is intended to be illustrative and non-limiting. Other examples include more steps, fewer steps, different steps, or a different order of the steps than described above.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A computer-implemented method comprising:
   receiving, by an event broker, an event message from a producer device, the event message having a payload and a key;
   storing, by the event broker, the event message in an event queue based on the key;
   transmitting, by a sender node of the event broker, the event message to an event consumer that is subscribed to receive event messages from the event queue; and
   subsequent to transmitting the event message to the event consumer:
      causing, by the event broker, the sender node to enter an idle state;
      receiving, by the event broker, an error message from the event consumer while the sender node is in the idle state;
      in response to receiving the error message, waking, by the event broker, the sender node from the idle state; and
      subsequent to waking from the idle state, initiating, by the sender node, a retry process involving iteratively re-transmitting the event message to the event consumer until either a threshold number of retry attempts have been performed or until an acknowledgement message is received from the event consumer.

2. The computer-implemented method of claim 1, further comprising:
   receiving, by the event broker, a notification from the event consumer, the notification indicating a transmission status of the event message; and
   based on receiving the notification, modifying, by the event broker, a transmission status indicator in a lookup table to indicate the transmission status of the event message, the lookup table corresponding to the event queue.

3. The computer-implemented method of claim 2, further comprising:
   determining, by the event broker and based on the transmission status indicator in the lookup table, that the event message was not transmitted to the event consumer successfully; and
   transmitting, by the event broker, the event message to a third-party device that is configured to transmit the event message to the event consumer.

4. The computer-implemented method of claim 2, wherein a dispatcher module of the event broker wakes the sender node in response to receiving the error message.

5. The computer-implemented method of claim 1, wherein the event broker, the sender node, and the producer device are edge-computing devices in an edge network.

6. The computer-implemented method of claim 1, wherein the event broker includes the producer device.

7. The computer-implemented method of claim 1, further comprising:
   removing, by the event broker and in response to determining that the event message has been successfully transmitted to the event consumer, the event message from the event queue.

8. A non-transitory computer-readable medium comprising instructions that are executable by one or more processing devices of an event broker for causing the event broker to:
   receive an event message from a producer device, the event message having a payload and a key;
   store the event message in an event queue based on the key;
   transmit, by a sender node of the event broker, the event message to an event consumer that is subscribed to receive event messages from the event queue; and
   subsequent to transmitting the event message to the event consumer:
      cause the sender node to enter an idle state;
      receive an error message from the event consumer while the sender node is in the idle state;
      in response to receiving the error message, wake the sender node from the idle state; and
      subsequent to waking from the idle state, initiate, by the sender node, a retry process involving iteratively re-transmitting the event message to the event consumer until either a threshold number of retry attempts have been performed or until an acknowledgement message is received from the event consumer.

9. The non-transitory computer-readable medium of claim 8, further comprising instructions that are executable by the one or more processing devices for causing the event broker to:
   receive a notification from the event consumer, the notification indicating a transmission status of the event message; and
   modify a transmission status indicator in a lookup table to indicate to the transmission status of the event message, the lookup table corresponding to the event queue.

10. The non-transitory computer-readable medium of claim 9, further comprising instructions that are executable by the one or more processing devices for causing the event broker to:

determine, based on the transmission status indicator in the lookup table, that the event message was not transmitted to the event consumer successfully; and transmit the event message to a third-party device that is configured to transmit the event message to the event consumer.

11. The non-transitory computer-readable medium of claim 9, wherein a dispatcher module of the event broker is configured to wake the sender node from the idle state in response to receiving the error message.

12. The non-transitory computer-readable medium of claim 8, wherein the event broker, the sender node, and the producer device are edge-computing devices in an edge network.

13. The non-transitory computer-readable medium of claim 8, wherein the event broker includes the producer device.

14. The non-transitory computer-readable medium of claim 8, further comprising instructions that are executable by the one or more processing devices for causing the event broker to:
in response to determining that the event message has been successfully transmitted to the event consumer, remove the event message from the event queue.

15. A system comprising:
one or more processing devices associated with an event broker; and
one or more memories having instructions that are executable by the one or more processing devices for causing the event broker to:
receive an event message from a producer device, the event message having a payload and a key;
store the event message in an event queue based on the key;
transmit, by a sender node of the event broker, the event message to an event consumer that is subscribed to receive event messages from the event queue; and
subsequent to transmitting the event message to the event consumer:
cause the sender node to enter an idle state;
receive an error message from the event consumer while the sender node is in the idle state;
in response to receiving the error message, wake the sender node from the idle state; and
subsequent to waking from the idle state, initiate, by the sender node, a retry process involving iteratively re-transmitting the event message to the event consumer until either a threshold number of retry attempts have been performed or until an acknowledgement message is received from the event consumer.

16. The system of claim 15, further comprising instructions that are executable by the one or more processing devices for causing the event broker to:
receive a notification from the event consumer, the notification indicating a transmission status of the event message; and
modify a transmission status indicator in a lookup table to indicate to the transmission status of the event message, the lookup table corresponding to the event queue.

17. The system of claim 16, further comprising instructions that are executable by the one or more processing devices for causing the event broker to:
determine, based on the transmission status indicator in the lookup table, that the event message was not transmitted to the event consumer successfully; and
transmit the event message to a third-party device that is configured to transmit the event message to the event consumer.

18. The system of claim 16, wherein a dispatcher module of the event broker is configured to wake the sender node from the idle state in response to receiving the error message.

19. The system of claim 15, wherein the event broker, the sender node, and the producer device are edge-computing devices in an edge network.

20. The system of claim 15, wherein the event broker includes the producer device.

* * * * *